Dec. 1, 1970 P. D. HUNTER 3,544,975
DATA INSERTION IN A CONTENT ADDRESSABLE SEQUENTIALLY ORDERED FILE
Filed May 24, 1968 8 Sheets-Sheet 1

INVENTOR
P. D. HUNTER
BY Howard R. Popper
ATTORNEY

Dec. 1, 1970 P. D. HUNTER 3,544,975

DATA INSERTION IN A CONTENT ADDRESSABLE SEQUENTIALLY ORDERED FILE

Filed May 24, 1968 8 Sheets-Sheet 2

Dec. 1, 1970 P. D. HUNTER 3,544,975

DATA INSERTION IN A CONTENT ADDRESSABLE
SEQUENTIALLY ORDERED FILE

Filed May 24, 1968 8 Sheets-Sheet 3

Dec. 1, 1970 P. D. HUNTER 3,544,975

DATA INSERTION IN A CONTENT ADDRESSABLE SEQUENTIALLY ORDERED FILE

Filed May 24, 1968 8 Sheets-Sheet 4

(ORIGINAL CONDITION)

(END OF FIRST REVOLUTION DURING INSERTION OF X)

(END OF SECOND REVOLUTION DURING INSERTION OF X)

FIG. 4

| BIT POSITION | HEADER WORD | CALLED NUMBER WORD | NEW NUMBER WORD | |
|---|---|---|---|---|
| 1 | 1 | 1 | 1 | GUARD BIT |
| 2 | 1 | 1 | 1 | |
| 3 | 1 | 1 | 1 | |
| 4 | 1 | 1 | 0 | TAG BITS |
| 5 | 1 | 0 | 0 | |
| 6 | CNA 8 | CNA 8 | NNA 8 | |
| 7 | CNA 4 | CNA 4 | NNA 4 | |
| 8 | CNA 2 | CNA 2 | NNA 2 | |
| 9 | CNA 1 | CNA 1 | NNA 1 | |
| 10 | CNB 8 | CNB 8 | NNB 8 | |
| 11 | CNB 4 | CNB 4 | NNB 4 | |
| 12 | CNB 2 | CNB 2 | NNB 2 | |
| 13 | CNB 1 | CNB 1 | NNB 1 | |
| 14 | CNC 8 | CNC 8 | NNC 8 | |
| 15 | CNC 4 | CNC 4 | NNC 4 | |
| 16 | CNC 2 | CNC 2 | NNC 2 | |
| 17 | CNC 1 | CNC 1 | NNC 1 | |
| 18 | CNTH 8 | CNTH 8 | NNTH 8 | |
| 19 | CNTH 4 | CNTH 4 | NNTH 4 | |
| 20 | CNTH 2 | CNTH 2 | NNTH 2 | |
| 21 | CNTH 1 | CNTH 1 | NNTH 1 | |
| 22 | | CNH 8 | NNH 8 | |
| 23 | | CNH 4 | NNH 4 | |
| 24 | | CNH 2 | NNH 2 | |
| 25 | | CNH 1 | NNH 1 | |
| 26 | | CNT 8 | NNT 8 | |
| 27 | | CNT 4 | NNT 4 | |
| 28 | | CNT 2 | NNT 2 | |
| 29 | | CNT 1 | NNT 1 | |
| 30 | | CNU 8 | NNU 8 | |
| 31 | | CNU 4 | NNU 4 | |
| 32 | | CNU 2 | NNU 2 | |
| 33 | | CNU 1 | NNU 1 | |
| 34 | | ST 8 | ACH 8 | |
| 35 | TA 11 | ST 4 | ACH 4 | |
| 36 | TA 10 | ST 2 | ACH 2 | |
| 37 | TA 9 | ST 1 | ACH 1 | |
| 38 | TA 8 | SU 8 | ACT 8 | |
| 39 | TA 7 | SU 4 | ACT 4 | |
| 40 | TA 6 | SU 2 | ACT 2 | |
| 41 | TA 5 | SU 1 | ACT 1 | |
| 42 | TA 4 | 1 (GUARD BIT) | ACU 8 | |
| 43 | TA 3 | CC 4 | ACU 4 | |
| 44 | TA 2 | CC 2 | ACU 2 | |
| 45 | TA 1 | CC 1 | ACU 1 | |
| 46 | PARITY | PARITY | PARITY | |

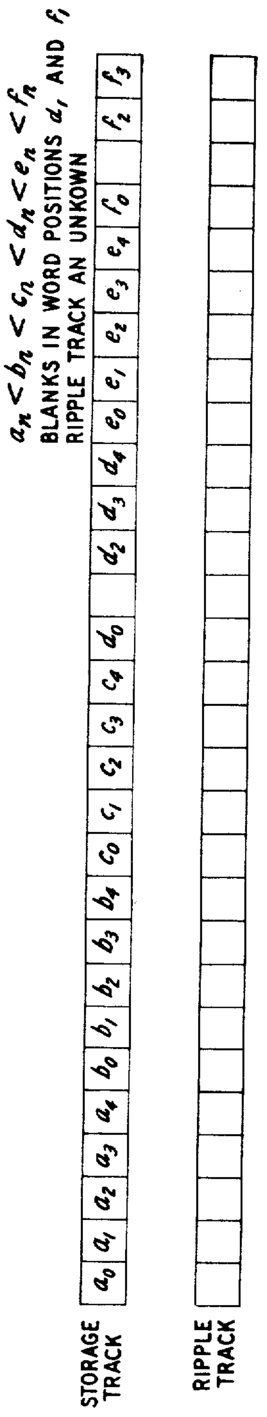
FIG. 6A (ORIGINAL CONDITION)
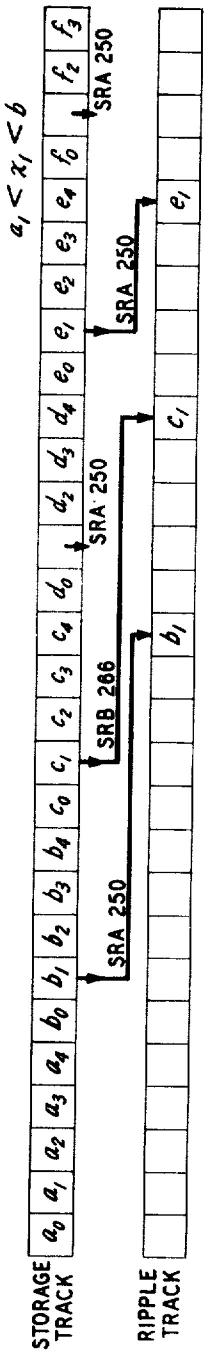
FIG. 6B (END OF FIRST REVOLUTION DURING INSERTION OF $X_1$ AND $X_2$)
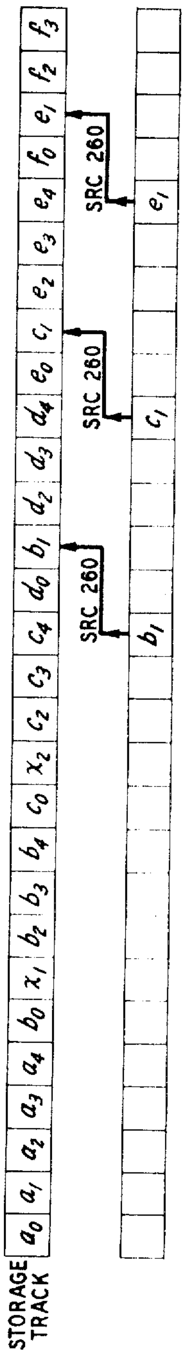
FIG. 6C (END OF SECOND REVOLUTION DURING INSERTION OF $X_1$ AND $X_2$)

3,544,975

DATA INSERTION IN A CONTENT ADDRESSABLE SEQUENTIALLY ORDERED FILE

Paul D. Hunter, Middletown Township, Monmouth County, N.J., assignor to Bell Telephone Laboratories, Incorporated, Murray Hill, N.J., a corporation of New York Filed May 24, 1968, Ser. No. 731,838
Int. Cl. G06f 7/32
U.S. Cl. 340—172.5 8 Claims

ABSTRACT OF THE DISCLOSURE

Circuitry is disclosed which uses a rotating magnetic disc file as a content addressable memory into which file both address data and information data are entered and arranged in a sequence of increasing, interlaced addresses. After entries are no longer needed, they are erased from the file. New entries are inserted in the file in accordance with their address data in appropriate positions within the aforementioned sequence. This is done by shifting the present entries of the file in order to make room for the new entries. A special track is provided for temporary storage and delay of the entries to be shifted.

BACKGROUND OF THE INVENTION

This invention relates to information retrievel systems and, more particularly, to the insertion of data in a content addressable, sequentially-ordered file.

In order to store large amounts of information efficiently and economically, several types of memory devices have been developed in recent years. Probably two of the most popular devices developed for this purpose are the magnetic drum and magnetic disc, both of which store information in the form of binary bits represented by the state of the magnetization of the material coating the surface of a moving member. Heads are provided in close proximity to the moving surface to read or detect changes of magnetic flux as the surface passes by. The heads convert these changes of flux into electrical signals and also can be energized to write or change the state of the magnetic flux on the moving surface. The reading operation does not destroy the magnetic state of the material passing under the head. This state can only be changed by a writing operation. Thus, in order to "erase" the surface, a signal must be applied which will cause the head to write and give the surface a predetermined magnetic state, usually one of uniform magnetization in a single direction. The bits are stored within "tracks" of the device, a track being defined as the area passing underneath a particular head during the rotation of the device. Large amounts of information can be stored on these devices, bit-packing densities on the order of 1,000 bits per linear inch quite commonly being attained.

Of course, the storage of large amounts of data is, in itself, useless unless the data can be retrieved from storage in an efficient manner. A popular technique for accessing information stored in large capacity memories is one in which the information to be retrieved is addressed by the information itself. The memory device, when this address technique is used, is sometimes referred to as a content addressable file. The information stored on the file is in the form of words composed of binary bits. Some of these bits contain address information for the word. When it is desired to retrieve a particular information word from the file, the address information of the word is provided to the information retrieval system. The tracks of the file are then searched until a word is encountered whose address information bits match the address information supplied. Storing the information words on the file in some predetermined order would enhance the retrieval efficiency of the information retrieval system. One such ordering is to arrange the information words in a sequence of increasing numerical order of the address information of the words.

If the information stored on the file is of a permanent character and the only operation performed by the system is a search of the file, no problems arise. However, if the information to be retrieved is of a continually changing character, a problem arises when it is necessary to insert an entry into the file in its proper position within the sequence. It is apparent that it would seldom be economically feasible to provide a random access memory with a capacity sufficient to assign fixed memory locations to every conceivable information word that might be addressed. This is especially true when only a fraction of the possible information words would ever be required to be put in storage at any given time. Therefore, a store of finite capacity is usually employed and it is necessary to rearrange the already stored data so that a new information word can be inserted in proper sequence. A prior solution to this problem was to use a rotating file which utilized separate heads for the read and write functions, the data passing under the read heads prior to passing under the write heads. In this type of device, data is written back onto the memory into its original position immediately after having been read. Delays could therefore be inserted between the read heads and the write heads in order to create a space into which new data could be inserted. However, if the memory device used is of the type utilizing a single head per track for both the reading and writing functions, such a technique could not heretofore be used.

It is therefore an object of the present invention to provide an information retrieval system utilizing a rotating single-head-per-track memory of the content addressable type.

It is a further object of this invention to store the information on the content addressable file in a sequence of increasing numerical order of address information.

It is another object of this invention to provide apparatus for the insertion of information into the file at the proper position in the sequence.

SUMMARY OF THE INVENTION

In accordance with this invention, apparatus is provided for retrieving information from, and updating the information on, a rotating, single-head-per-track magnetic memory device. In the illustrative embodiment of this invention, the memory device used is a magnetic disc file unit. The information stored in the disc file unit may pertain, for example, to the status of telephone numbers belonging to or served by one or more central offices.

The disc file unit is driven at a uniform speed so that the word locations on the surface of the disc occur in a fixed time relationship. In order to overcome certain engineering problems, such as the inability economically to build reliable write circuits which are capable of sustaining high currents over a high duty cycle, disc systems have been developed wherein sequentially addressable word locations are physically spaced, commonly referred to as interlaced, along the tracks of the disc. These systems provide for the sequentially addressable storage locations to be offset spatially by a predetermined number of data word storage locations. For instance, an interlace factor of two would find the sequentially addressable locations spaced every other spatial location along a track of the disc while an interlace factor of three would find the sequentially addressable storage locations spaced every third storage location along a track. Interlacing thus provides a time lapse, or accessibility interval, between the occurrence of sequentially addressable word locations.

In the illustrative embodiment of this invention information such as that relating to recently changed telephone numbers is stored on a disc file in an interlaced content-addressable manner with an interlace factor of five according to the increasing numerical value of the telephone numbers. When it is desired to insert an entry into the disc file unit, the information which is already stored is rearranged to create a space into which the desired entry may be inserted by employing a special track, designated the "ripple" track. A sequential search of the file is made until there is found the first stored item corresponding to a telephone number greater in numerical value than the telephone number associated with the entry to be inserted. When this item is found, it is written onto the ripple track three interlaces later than the interlace of its original position. All succeeding items on the original storage track are written onto the ripple track in the same manner until there is found on the original storage track a blank position which either had been created as a result of a prior erasure or else is a portion of the disc in which information had never been stored. On the next revolution of the disc file unit, the new entry is written onto the original storage track in the position previously occupied by the item next higher in numerical value of its telephone number. The items on the ripple track are written onto the original storage track in positions two interlaces later than their positions on the ripple track. The result of these manipulations is to insert the desired entry into the position previously occupied by the item of next greater numerical value and to shift and delay all succeeding items within that interlace until a previously blank position is filled.

Accordingly, it is a feature of the present invention to utilize the rotating memory as a recirculating storage and delay line during the insertion of information onto the same memory.

DESCRIPTION OF THE DRAWING

The foregoing and other objects and features may become more apparent by referring now to the drawing in which:

FIG. 4 shows the formats of the various types of words stored on the disc file unit of the illustrative embodiment; and FIGS. 5A, 5B, 5C, 6A, 6B, and 6C graphically depict intermediate steps in the insertion of entries into the disc file unit of the illustrative embodiment in accordance with the principles of the present invention.

GENERAL DESCRIPTION

Figure 1:
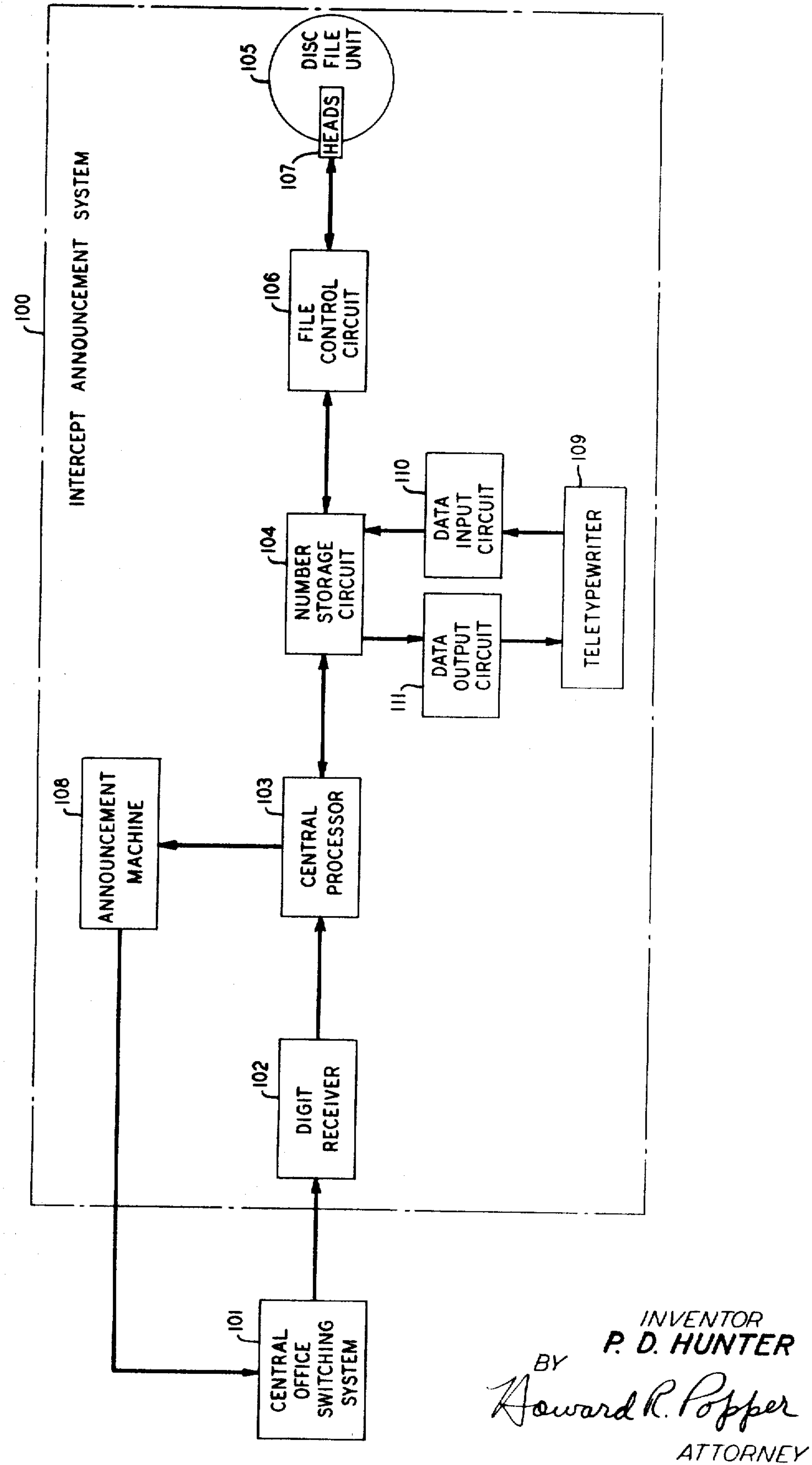
FIG. 1 shows an illustrative information retrieval and announcement system employing a memory file whose contents are updated in accordance with the principles of the present invention.

FIG. 1 shows an information retrieval and announcement system comprising an intercept announcement system 100 connected to telephone central office switching system 101. The announcement system of the illustrative embodiment has as its purpose the provision of recorded announcements to customers who have reached telephone numbers that do not correspond to presently operative telephone stations. Such telephone numbers are referred to as being on "intercept." There are several conditions which may cause a telephone number to be on intercept, e.g., the number may be changed, disconnected, vacant, or out of order. The announcement returned to the calling customer advises him of the relevant condition. If the party who previously could be reached at the telephone number which is now on intercept presently has a different assigned telephone number, the calling customer is also advised of this new number.

When a calling customer reaches an intercepted telephone number in central office 101, the digits of this called and intercepted telephone number are transmitted to digit receiver 102, as described, for example, in U.S. Pat. No. 3,143,601, issued Aug. 4, 1964 to A. E. Joel, Jr. Central processor 103 extracts these digits from digit receiver 102 and transmits the called number to number storage circuit 104. All information relating to telephone numbers which are on intercept and can be reached through central office 101 is stored on disc file unit 105 which, in the illustrative embodiment, is a single-head-per-track magnetic disc file, such as the Burroughs Corporation type BC 475 disc file storage unit. File control circuit 106 controls the selection and enabling of heads 107 and contains the circuitry necessary to write information onto and read information from disc file unit 105. Number storage circuit 104 controls the operation of file control circuit 106 and the combination of these two circuits working together causes the information stored on disc file unit 105 to be searched in order to retrieve the information relating to the called number. This latter information is transmitted from number storage circuit 104 to central processor 103. Processor 103, which is a stored program machine, utilizes this information to control announcement machine 108. This latter machine includes a magnetic recording drum upon the tracks of which are recorded signals representative of phrases of speech. Announcement machine 108 is connected through central office switching system 101 to the calling customer's line. Processor 103 utilizes the information about the called number received from disc file unit 105 to control the selection of tracks within announcement machine 108 so as to transmit to the calling customer an audio message which informs the customer of the status of the called number.

Teletypewriter 109 is used when it is desired to update the information content of disc file unit 105 so that it accurately represents the current status of intercept information within central office switching system 101. Instructions are transmitted to number storage circuit 104 from teletypewriter 109 via data input circuit 110, which translates the teletypewriter code into a code usable by number storage circuit 104. These instructions are accompanied by the appropriate called number and, where relevant, status information and a new number. Number storage circuit 104, in conjunction with file control circuit 106, causes disc file unit 105 to be updated in accordance with the instructions and accompanying information. In addition to the foregoing, teletypewriter 109 may be used to transmit instructions to number storage circuit 104 which cause this circuit to search disc file unit 105 and transmit the desired information from disc file unit 105 to teletypewriter 109 via data output circuit 111, which translates the information into a code which can be utilized by teletypewriter 109, where it is printed in a form which is readily comprehended by a human operator at the console of the teletypewriter.

DISC LAYOUT

There are two types of tracks on disc file unit 105; data storage tracks and clock tracks. The clock tracks have timing information written thereon prior to the systems being put into operation. This information remains on the unit for the life of the unit within the system, whereas information, which may be on the data storage tracks at any given time, is of a temporary nature and is altered by the system during the normal course of events, as will be described hereinafter. There are three clock tracks, each of which contains a different form of timing information. The first of these tracks contains what will be referred to as the Track Index (TI), the second contains the Bit Clock (BC), and the third contains the Pattern. The track containing the Track Index is uniformly magnetized in a single direction with the exception of a small portion which is magnetized in the opposite direction. The second clock track is magnetized in a pattern of alternating magnetic polarities, each unit of this pattern being of the same length. The third clock track is magnetized in a repetitive pattern of polarities, the period of repetition being equal in length to 46 units of the pattern on the second clock track. There is a total of 73,600 units on the Bit Clock track. Therefore, there are 1,600 (73,600÷46=1,600) repetitions of the Pattern on the Pattern track.

The data tracks are divided into three types: locator tracks, storage tracks, and a ripple track. The locator track is used in the first stage of a data look-up, acting as a "table of contents" and containing the address of the storage track upon which a data word is located. The storage tracks comprise the bulk memory and contain the data which is used by the system. The ripple track is used as a scratch storage track of variable length during the addition of new entries into disc file unit 105.

Figure 2A:
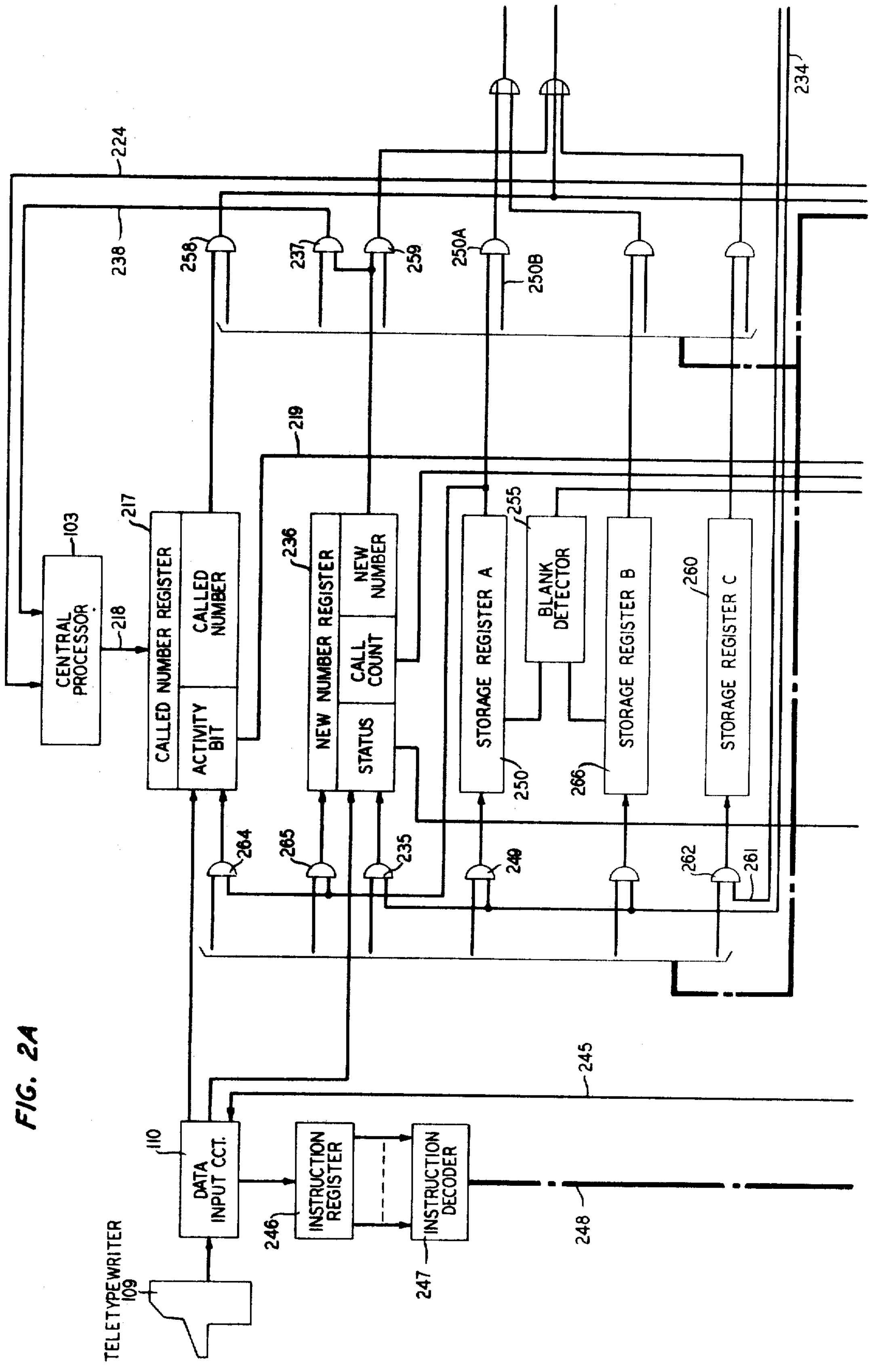
FIGS. 2A through 2D (arranged as shown in FIG. 2) show an illustrative embodiment of the invention which may be employed in the information retrieval and announcement system of FIG. 1.
Figure 2B:
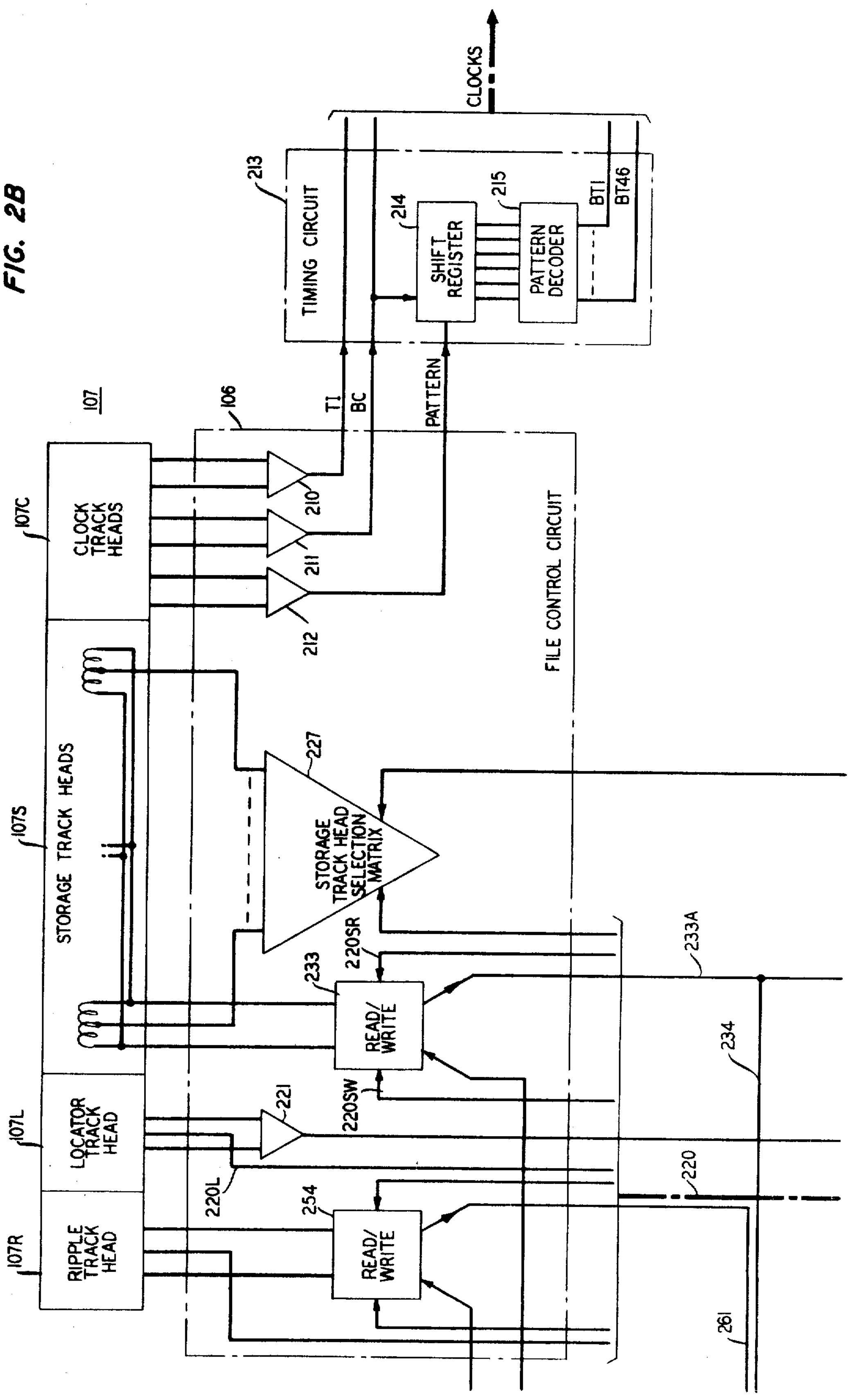

Disc file unit 105 includes a plurality of read-write heads 107, FIG. 2B, each of which comprises a center tapped winding. A particular one of the storage track heads 107S is selected for reading or writing by storage track selection matrix 227 applying a reference potential to its center tap. When a head is enabled for reading, each change of magnetic flux that passes under the head produces electrical pulses at the two outer terminals of the head of opposite polarities. The polarities are dependent upon the direction of the flux change. The pulses from the two ends of the enabled head are transmitted to the two inputs of a difference amplifier (not shown) within read/write circuit 223; the amplifier is arranged with two outputs, one for each direction of the flux change. Thus, an alternating pattern of magnetic flux passing under an enabled head will result in a stream of pulses at each output of the corresponding amplifier, the pulses in one stream being intermediate in time between the pulses in the other stream. Information is written onto the disc in a non-return-to-zero manner with one direction of magnetization corresponding to a binary "1" and the other direction of magnetization corresponding to a binary "0." Therefore, a pulse will be produced at one of the two outputs of an amplifier only when adjacent bits have different binary values. To determine the value of a recorded bit, flip-flops, not shown, are connected to the outputs of amplifier 221 and the amplifiers within read/write circuits 233 and 254. These flip-flops store the direction of the last change of magnetic flux passing under the enabled head. In order to write information into the disc file unit, signals must be applied to either one side or the other of an enabled head, depending upon the binary value of the information to be written.

The flux changes of the Track Index track are sensed by amplifier 210 in file control circuit 106, FIG. 2B. Amplifier 210 transmits one output pulse for every two flux changes on the Track Index track. This pulse is designated Track Index (TI) and occurs once per revolution, being used merely to mark the "beginning" of all tracks. The magnetic flux changes detected by the head associated with the Bit Clock track are converted into two pulse streams at the outputs of amplifier 211 in file control circuit 106, where they are OR-ed together to form a single stream of uniform polarity pulses designated as the Bit Clock (BC). This Bit Clock is the basic timer for the system, each pulse defining a time slot for a single bit of data on disc file 105. The repetitive pattern written on the Pattern track produces a repetitive pattern of electrical pulses at the outputs of amplifier 212.

The above-mentioned timing signals are transmitted over leads TI, BC, and PATTERN, respectively, to timing circuit 213. The timing signal on lead BC gates six-stage open-ended shift register 214 to receive the timing signals applied on lead PATTERN. The pattern timing signals comprise 46 different sequences of six consecutive bits. The output from each of the stages of shift register 214 is connected to pattern decoder 215 which provides a signal on one of its 46 outputs, designated BT1 through BT46, corresponding to the particular 6-bit pattern delivered by shift register 214.

Figure 3:
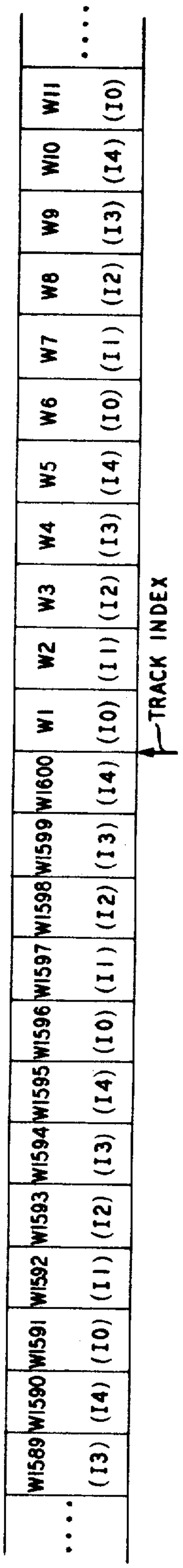
FIG. 3 shows the arrangement of the word segments on the storage tracks of the disc file unit of the illustrative embodiment.

The word segments are arranged in the storage tracks as shown in FIG. 3 and each word is assigned an interlace number for addressing purposes. There are five valid interlaces, 0 through 4. The first word in time after Track Index is in interlace 0, the second word is in interlace 1, and so on so that the fifth word is in interlace 4. The sixth word is in interlace 0, and this pattern continues around the track until the 1,600th word, which is in interlace 4. This word appears, in time, immediately preceding the Track Index. The sequence of data word storage begins in interlace 0 of the first data storage track, continues in interlace 1 of that track, then interlace 2, interlace 3, interlace 4, interlace 0 of the second data storage track, and so on. This has the effect of dividing each physical storage track into five tracks whose corresponding word segments are offset from one another.

WORD FORMATS

The system of the illustrative embodiment was designed to operate as a retrieval system for data pertaining to telephone numbers which, for any of several reasons, do not refer to working telephone stations. This data contains status information as to the reason that the telephone station is not working. If this status indicates that there is a different telephone number assigned to the party who previously could be reached at a non-working telephone number, the data also contains the new telephone number at which the party can be reached. The data is addressed by using the non-working telephone number itself.

There are three types of data words stored on disc file unit 105: Header words, Called Number words, and New Number words. The formats of these words are shown in FIG. 4. Each of the seven digits of a telephone number, the A, B, and C digits of the office code and the four digits (thousands, hundreds, tens and units) of the station number is represented in binary-coded decimal (8–4–2–1) form. The digits referring to the called number are preceded in FIG. 4 by the abbreviation CN, and the digits referring to the new number are preceded by the abbreviation NN.

In the Header word, the bits designated TA1 through TA11 refer to the binary track address where the first word of the Thousands group defined by the remaining information bits of that Header word may be found. A Thousands group consists of all the telephone numbers having the same A, B, C, and Thousands digits. Bits TA1 through TA3 are the least significant bits of the track address and define in which of the five valid interlaces the beginning of the Thousands group is located, while bits TA4 through TA11 specify one of 256 possible storage tracks. The abbreviation ST in the Called Number word refers to the Tens digit of the status of that called number and the abbreviation SU signifies the Units digit of the status. CC signifies the call count of the called number. This is the number of times, up to seven, that this called number has been looked up. Every telephone number also has associated with it an area code. This area code, abbreviated as AC, is a three-digit number having a Hundreds digit, a Tens digit, and a Units digit. The area code is only given for a new number whose area code is different from that of the associated called number. Each type of word also contains guard bits, as its first three bits, which are normally written as binary 1's. These serve the purpose of separating words, and in the Called Number word separate the status information from the call count information. The fourth and fifth bits of each word are called tag bits and serve the purpose of designating the type of word, Header words having a tag of 11, Called Number words having a tag of 10, and New Number words having a tag of 00. Each word also has a parity bit as its last bit. This bit preserves odd parity over the entire 46-bit word; i.e., if the total number of binary 1's in bits 1 through 45 of the word is even, the parity bit will be a binary 1.

The locator track contains only Header words and the storage tracks contain the Called Number words and the New Number words. The ripple track is used during the insertion of new entries into the storage tracks as will hereafter be more particularly described.

In the systems of FIGS. 2A through 2D, sequential control circuit 216 transmits enabling and gating signals to the various other units of the system in order to control information retrieval from, and information insertion into, disc file unit 105. Circuit 216 functions as the coordinator of the system's operations, and either a wired logic or stored program machine may be employed in this capacity.

LOOK-UP

The system of the illustrative embodiment performs three basic operations. The first, and most frequently performed, is the look-up operation. Information pertaining to the status of a called number is obtained from file unit 105 by central processor 103 inserting the called number into called number register 217 over leads 218. Simultaneously, processor 103 inserts into register 217 an activity bit which is sensed by sequential control circuit 216, over lead 219. Responsive to the energization of lead 219, sequential control circuit 216 enables the center-tap of locator track head 107L by applying a reference potential on lead 220L via enabling cable 220. The signals sensed by the enabled locator track head 107L are applied to locator track read circuit 221, the output of which is gated through gates 221A and 222 to serial match circuit 223, FIG. 2C. In match circuit 223, the Header words read from the locator track are compared with the called number stored in called number register 217. It will be recalled that the Header words are stored on the locator track in increasing numerical order according to Thousands groups. Serial match circuit 223 is arranged to receive the words to be compared in a serial manner, the most significant bit arriving first. Advantageously, a serial match circuit of the type described, for example, on p. III–10 of "Building Blocks Technical Manual," published by the Distributor Products Division of the Raytheon Corporation may be employed. Sequential control circuit 216, FIG. 2C, receives the BT1–BT46 bit time signals over cable clocks from timing circuit 213 (FIG. 2B). Sequential control circuit 216 applies the signals from leads BT6–BT21 to lead 222A to gate 222. Gate 222 thereupon passes only bits 6–21 of the Header words read from head 107L to serial match circuit 223. Bits 6–21 comprise the address portion of the Header words and match circuit 223 compares these bit by bit with the bits of the first four digits of the called number stored in called number register 217. Output 223A of circuit 223 is activated when the bits of the word being read from the disc have a greater numerical value than the bits of the word stored in called number register 217. If output 223A is activated during the look-up operation, at any time prior to output 223B which signifies a match, this condition indicates that the Thousands group being looked up is not present in disc file unit 105. The energization of lead 223A prior to lead 223B is detected by sequential control circuit 216 which thereupon energizes lead 224 to central processor 103. Upon the occurrence of a matching indication from serial match circuit 223, sequential control circuit 216 (FIG. 2C) enables gate 225 (FIG. 2D) and bits 35 through 45 of this Header word are gated into track address register 226, FIG. 2D.

Upon the occurrence of the next Track Index pulse on lead TI of cable clocks, sequential control circuit 216 disables the locator track head by removing the reference potential on lead 220L and enables storage track head selection matrix 227 to enable the storage track head which is defined by the contents of track address register 226.

Figure 2C:
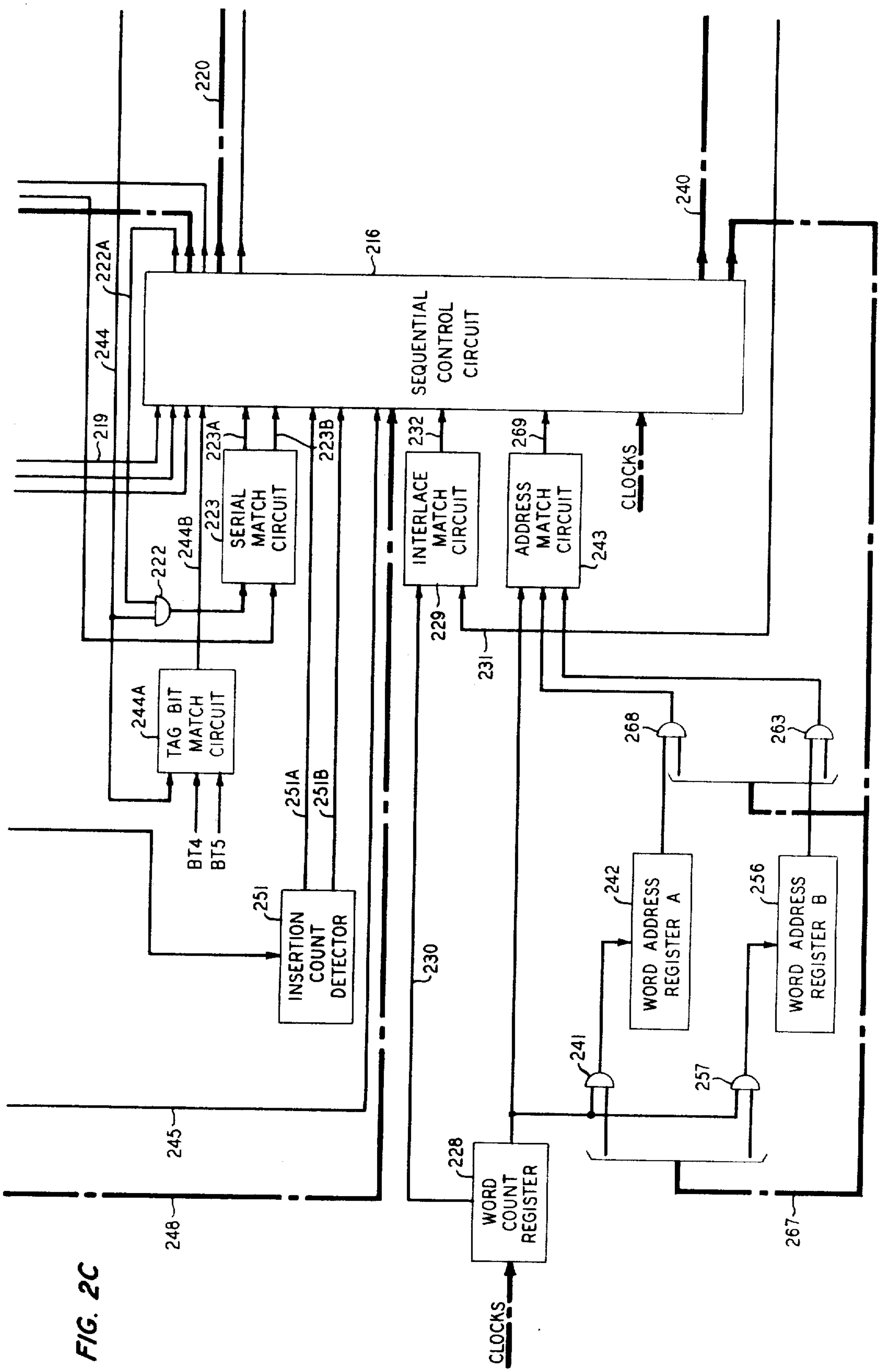
Figures 2, 2D:
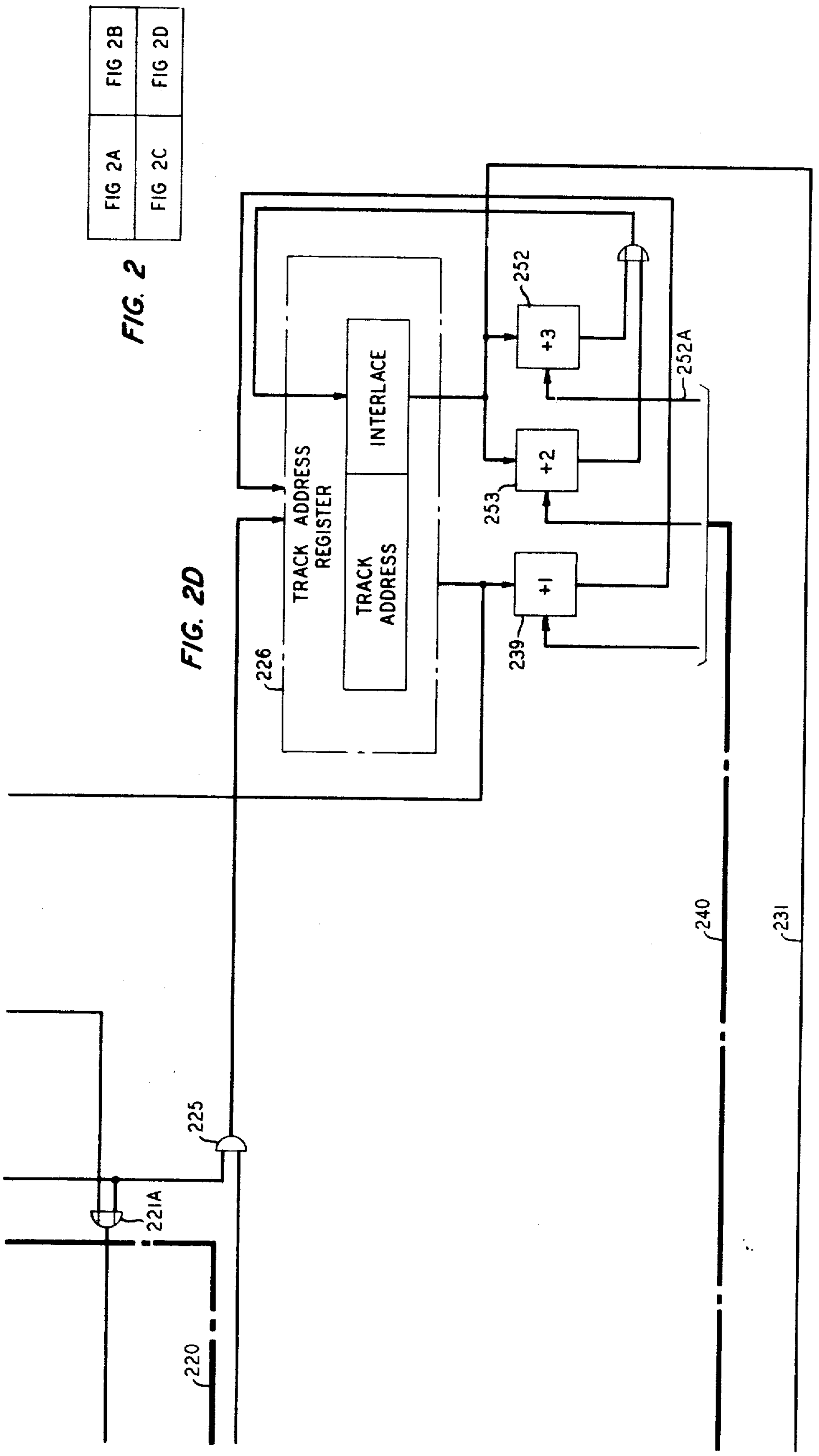

Word count register 228, FIG. 2C, receives all the clocks of the system from timing circuit 213 and counts each time that lead BT46 is energized. Register 228 is reset by TI. The count accruing in register 228, therefore, indicates the number of words since Track Index time. It is arranged so that its three least significant stages can only count up to four before they are reset and generate a carry signal to the next most significant stage. These three least significant stages correspond to the number of the present interlace. The contents of these stages are transmitted to interlace match circuit 229 over leads 230. The three least significant bits stored within track address register 226 signify the interlace that properly should be addressed. These bits are transmitted to interlace match circuit 229 over leads 231. Interlace match circuit 229 compares the two sets of input information and indicates to sequential control circuit 216 over lead 232 when the information passing under the heads is in the desired interlace.

During this desired interlace, storage track read/write circuit 233 is enabled over lead 220SR by sequential control circuit 216 to read the words on the storage track selected by the contents of track address register 226. The Called Number words and New Number words are stored on the storage tracks in a sequence of increasing numerical order of called numbers with the New Number words following their corresponding Called Number words. This sequence is arranged on the tracks within the interlacing storage format. The words read from the storage track appear on cable 233A, FIG. 2B, and are applied through gate 221A to gate 222, FIG. 2C, and thence to serial match circuit 223. Sequential control circuit 216 applies the signals from leads BT6–BT33 via lead 222A to gate 222 so that bits 6 through 33 of these words are gated into serial match circuit 223 to be compared with the entire called number stored in called number register 217. If serial match circuit 223 indicates to sequential control circuit 216 that the word being read from the storage track has a greater called number than the called number stored in called number register 217, this indication, signifying that the called number is not present in disc file unit 105, is transmitted to central processor 103 via lead 224. When serial match circuit 223 indicates via its output 223B to sequential control circuit 216 that a Called Number word has been found whose bits 6 through 33 match the called number in register 217, sequential control circuit 216 controls gate 235, FIG. 2A, to gate bits 34 through 41 and 43 through 45 of this word serially appearing on lead 234, into new number register 236. It will be recalled that bits 34 through 41 define the status of the called number and that bits 43 through 45 define the call count.

Sequential control circuit 216 receives a signal from interlace match circuit 229 over lead 232 when the next word in the interlace is passing under the heads. At this time read/write circuit 233, FIG. 2B, is enabled over lead 220SR to read the next word in the same interlace. Tag bit match circuit 244A examines bits 4 and 5 of this word via lead 244. These bits are the tag bits and if these bits are "00" this signifies that a new number is associated with the called number. Tag bit match circuit 244A produces an output on lead 244B when such a condition exists. Bits 6 through 45 of this word are then gated over lead 234 through gate 235 into new number register 236. The contents of new number register 236 are then transmitted to central processor 103 through gate 237 and over leads 238.

The above description has assumed that the desired information was contained on the track specified by bits 35 through 45 of the found Header word. If the Track Index signal had occurred prior to the finding of either the Called Number word or the New Number word, sequential control circuit 216 would energize increment cable 240 to add-one circuit 239. The output of add-one circuit 239 would have incremented the contents of track address register 226 so that either the next interlace or the next track would be read by read/write circuit 233.

When serial match circuit 223 produces an output on lead 223B, indicating that the proper Called Number word has been found, the contents of word count register 228 are gated through gate 241, FIG. 2C, into word address register A 242. After the contents of new number register 236 have been transmitted to central processor 103, sequential control circuit 216 increments the call count bits of the Called Number word, stored in new number register 236, FIG. 2A, to reflect the fact that that was a look-up with respect to this called number. During the following revolution of disc file unit 105, the contents of word address register A 242 are matched against the present word address, as determined by the contents of word count register 228, in address match circuit 243. When there is a match of word addresses, this indicates that the word being read is the same word that was previously looked up. At this time, sequential control circuit 216 opens gates 258 and 259 during the bit times that correspond, within a Called Number word, to the information stored in called number register 217 and new number register 236. Read/write circuit 233 is also enabled at this time via lead 220SW so that the Called Number word is rewritten into this position with the incremented call count.

DELETION

The second basic operation of the system is a delete operation. If it is desired to delete from disc file unit 105 all information relating to a particular called number, this called number, plus bits which indicate that a delete operation is desired, are transmitted by teletypewriter 109 to data input circuit 110. Data input circuit 110 includes a shift register (not shown), three of whose stages contain the instruction bits. Sequential control circuit 216 transmits over leads 245 a continuous clock signal to data input circuit 110. When the shift register in data input circuit 110 has been filled from teletypewriter 109, leads 245 to sequential control circuit 216 is energized. Sequential control circuit 216, if not performing any other operation, then enables gates (not shown) in data input circuit 110 to gate the contents of its shift register into the appropriate registers of the system. The instruction bits in the three instruction bit stages of the aforementioned shift register are gated into instruction register 246 and the called number bits are gated into called number register 217. The contents of instruction register 246 are decoded by instruction decoder 247 and a signal is transmitted to sequential control circuit 216 over the lead instruction cable 248 that corresponds to a delete instruction.

Sequential control circuit 216 now performs the same control functions as were previously described for the look-up operation with respect to the called number which has been placed in called number register 217 except that no information is inserted into new number register 236. The address of the Called Number word is stored in word address register A 242 by sequential control circuit 216 enabling gate 241 via cable 267 when serial match circuit 223 indicates over lead 223B that a match has occurred. During the next revolution of disc file unit 105, gate 268 is enabled via cable 267 and the present word count, as determined by register 228, is compared with the contents of word address register A 242. When a match occurs, sequential control circuit 216 is notified over lead 269 and enables read/write circuit 233 over lead 220SW to write that word to a state of all binary "0's." The tag bits of the following word had been examined during the preceding revolution by tag bit match circuit 244A over leads 244 so that if this circuit indicated to sequential control circuit 216 over lead 244B the presence of a New Number word, then this word is also erased by sequential control circuit 216 enabling read/write circuit 233 over lead 220SW the next time interlace match circuit 229 indicated the proper interlace. This operation causes blanks to be generated substantially at random throughout disc file unit 105. These blanks serve a useful purpose during an insert operation, as will be shown by the following discussion.

INSERTION

The third basic operation of the system is the insertion of information into disc file unit 105. Since it is desired that the called numbers shall always be stored in numerical order, when any new information is to be stored it must be inserted into its proper numerical position. When such an insertion is desired, the called number and accompanying information is inserted into data input circuit 110 from teletypewriter 109. In the same manner as previously described, the instruction bits are gated into instruction register 246 and the called number bits are gated into called number register 217. For an insertion operation, status bits and possibly new number bits have also been placed in the shift register (not shown) in data input circuit 110. These bits are similarly gated out of the shift register, the status bits being gated into new number register 236, and, if applicable, the new number bits are also gated into new number register 236. If some of these bits are nonexistent in the shift register in data input circuit 110, then blanks are gated into new number register 236.

A search of the locator track is made, in the same manner as previously described, for the Header word corresponding to the called number in register 217. The storage track defined by the found Header word is then searched until serial match circuit 223 indicates to sequential control circuit 216 that there has just been read from a unique position on the storage track a word corresponding to a called number which is numerically greater than the called number to be inserted. Upon such an indication, sequential control circuit 216 enables gate 241 via cable 267 so that the address of this word is stored in word address register A 242. During this search operation as each word was read from the storage track it was gated through gate 249 into storage register A 250. Storage register A 250 can hold only one word so that as a word is gated into register 250, that word takes the place of the preceding word. The last word gated into storage register A 250, and the only word remaining stored in that register, is the word which just caused serial match circuit 223 to energize its output 223A thereby sending the "greater-than" indication to sequential control circuit 216.

At this point, separate discussions are necessary for the case in which only one word is to be inserted into disc file unit 105 and the case in which two words are to be inserted. Insertion count detector 251 examines the status bits stored in new number register 236 and determines whether or not new number information is associated with the called number stored in called number register 217. Lead 251A to sequential control circuit 216 is energized by insertion count detector 251 if one word is to be inserted into disc file unit 105 and lead 251B is energized if two words are to be inserted.

INSERTION OF ONE WORD INTO DISC FILE UNIT 105

Assuming that there is no new number associated with a called number to be inserted, sequential control circuit 216, responsive to the energization of lead 251A, causes add-three circuit 252, by energizing lead 252A in cable 240, to increment the interlace number, stored as the three least significant bits in track address register 226, by three. The incrementing is done on a mudulo-five basis to only the three least significant bits by add-three circuit 252. The rest of the bits stored in track address register 226 remain unchanged, these bits defining the physical track on disc file unit 105. Sequential control circuit 216 now enables the ripple track and associated read/write circuit 254 via enable cable 220. Gate 250A at the output of storage register A 250 is now enabled by sequential control circuit 216 energizing lead 250B, thereby causing the word in register 250 to be written onto the ripple track within the new interlace indicated by the contents of register 226. Add-two circuit 253, under the control of sequential control circuit 216, now adds two to the interlace address stored in track address register 226, thus resulting in the originally selected interlace. The storage track defined by the contents of track address register 226 is now accessed and the next word within the selected interlace is inserted into storage register A 250. Blank detector 255 examines bits 6 through 9 of the word in register 250. If these bits are all binary 0's, this indicates that the word just read from the disc is a blank and sequential control circuit 216 is notified of this condition. If the word is not a blank, then add-three circuit 252 is caused to increment the selected interlace by three and the word in storage register A 250 is written onto the ripple track in this interlace. Add-two circuit 253 then increments the selected interlace by two, the storage track is accessed and the next word on the storage track is inserted into storage register A 250. This insertion continues until a blank is detected in storage register A 250 by blank detector 255. When this condition occurs, the address of the blank is inserted into word address register B 256 via gate 257 and the transfer of words from the storage track to the ripple track is disabled, or inhibited, by sequential control circuit 216 removing all enabling signals from the various gates, the read/write heads, and the track head center taps. At this point, the condition of the system is as follows:

(a) Called number register 217 contains the called number to be inserted onto disc file unit 105;
(b) New number register 236 contains the status of the called number which is to be inserted;
(c) Word address register A 242 contains the address of the first word on the disc whose called number is greater than the called number stored in called number register 217;
(d) Word address register B 256 contains the address of the first blank following the address stored in word address register A 242; and
(e) The ripple track on disc file unit 105 contains all of the words from the original storage track that were initially between the addresses stored in word address register A 242 and word address register B 256 and were in the same interlace on the original storage track. The words stored on the ripple track are now in an interlace having a number three greater than the number of their original interlace.

The system is now ready to write the new data into its proper location on disc file unit 105 and to rewrite the words from the ripple track back onto the storage track. Address match circuit 243 notifies sequential control circuit 216 when the present word address, as determined by word count register 228, matches the address stored in word address register A 242. This notification is a signal over lead 269 and constitutes a first match indication. When this occurs, sequential control circuit 216 enables storage track head selection matrix 227 and read/write circuit 233. Gates 258 and 259 are enabled such that the information passing out of register 217 and 236 is formed into a Called Number word. This word is thus written onto disc file unit 105 in the address defined by the contents of word address register A 242 and track address register 226. Add-three circuit 252 is caused to increment the interlace address by three. The storage track is disabled and the ripple track is now enabled. During the new selected interlace the word on the ripple track is read and stored in storage register C 260 via lead 261 and gate 262. Add-two circuit 252 is caused to increment the interlace address by two and the storage track is again enabled. During this selected interlace, the contents of storage register C 260 are retransferred and written onto the storage track. At this time, sequential control circuit 216 opens gate 263 and examines the output of address match circuit 243 to determine from the presence of a second match indication over lead 269 that the position just written into has the same word address, determined by word count register 228, as the address stored in word register B 256. If so, the insert operation is complete and the retransfer of words from the ripple track back to the storage track is disabled, or inhibited, by sequential control circuit 216 removing all enabling signals from the various gates, the read/write heads, and the track head center taps. If not, then add-three circuit 252 must increment the interlace by three, the ripple track and associated circuitry is enabled, and the next word on the ripple track is read from that track and inserted into storage register C 260, to be written onto the storage track in a position two interlaces subsequent. This cycle continues until the address stored in word address register B 256 is reached.

Figure 5A:
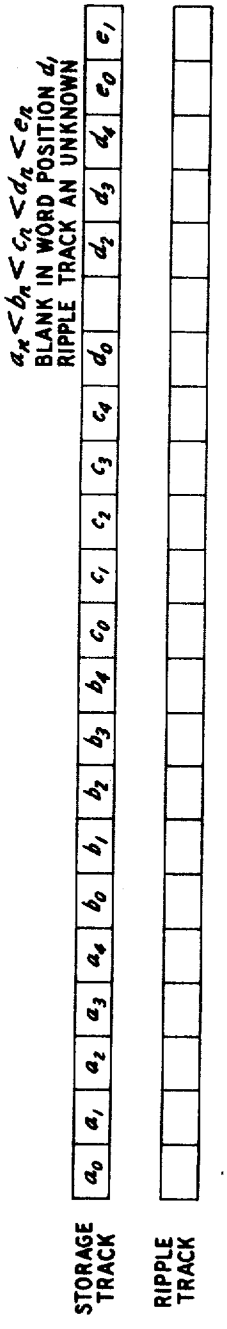
Figure 5B:
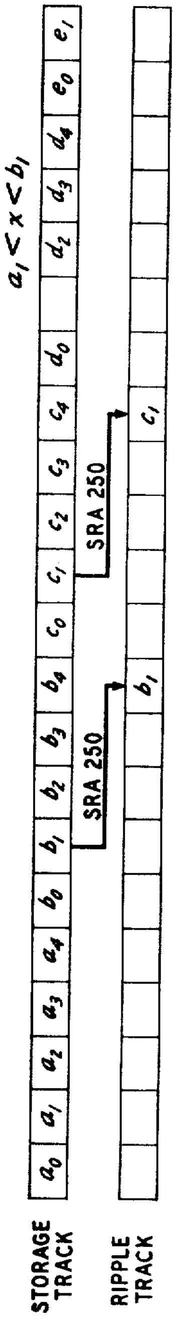
Figure 5C:
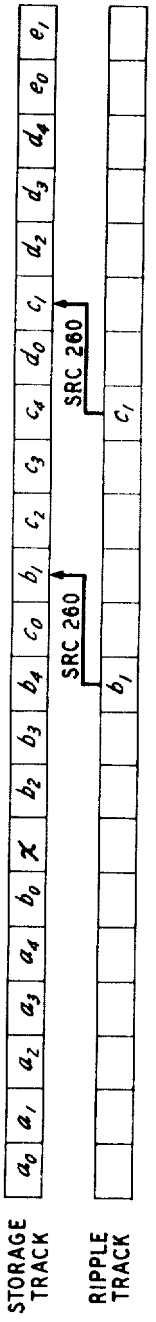

The above discussion has ignored the case where a blank has not been found before the end of the track, as determined by a Track Index signal, is reached. If this occurs, the rewrite operation onto the storage track is preformed and the last word on the track remains stored in storage register A 250. This word is broken down into its component parts which are stored in called number register 217 and new number register 236 via gates 264 and 265. It is then inserted onto the next track, or next interlace of the present track, in the same manner as was just described. Thus, two revolutions of disc file unit 105 are necessary for each interlace in which data must be moved; the first revolution being used to temporarily store and delay the information to be moved, using the ripple track as the temporary storage and delay element, and the second revolution being used to rewrite the information into the original interlace, one position subsequent to its original position within that interlace. Reference to FIGS. 5A, 5B, and 5C, will disclose the results of the above-described operations.

INSERTION OF TWO WORDS INTO DISC FILE UNIT 105

When there is a new number associated with a called number to be inserted, this requires that two words be formed from this information and inserted into disc file unit 105. The principle involved in inserting two words is the same as that involved in the insertion of a single word. After the first word is found whose called number is numerically greater than the called number to be inserted, this word is stored in storage register A 250 and its address is stored in word address register A 242. The next word within that interlace is read from disc file unit 105 and stored in storage register B 266. Sequential control circuit 216 now causes add-three circuit 252 to add three to the selected interlace and during this new selected interlace the contents of storage register A 250 are written onto the ripple track. Add-two circuit 253 is now caused to increment the selected interlace by two and the storage track is enabled. During this interlace, the next word on the storage track is read from that track and inserted into storage register A 250. Blank detector 255 examines bits 6 through 9 of storage register B 266 and informs sequential control circuit 216 whether that register contains a blank at this time. If this is the case, this means that one of the two necessary blanks has been located and the steps followed by the system, under the control of sequential control circuit 216, are the same as those followed during the insertion of a single word, with the exception that during the rewrite operation, two words are formed from the data stored in called number register 217 and new number register 236 and these two words are written onto the storage track before the first-found greater-than word is written from the ripple track onto the storage track.

If the blank detector 255 did not indicate the existence of a blank in storage register B 266, add-three circuit 252 is caused to increment the selected interlace by three. The ripple track is enabled and during the selected interlace the contents of storage register B 266 are written onto the ripple track. The selected interlace is then incremented by two and bits 6 through 9 of storage register A 250 are examined by blank detector 255. If storage register A 250 contains a blank, then during the selected interlace the next word on the storage track is read from that track and inserted into storage register A 250. The steps involved in the insertion of a single word are then followed.

If storage register A 250 does not contain a blank, the above-described cycle is repeated. To reiterate, this cycle consists of alternately using storage register A 250 and storage register B 266 to temporarily store words that are read from the storage track and written onto the ripple track. Using both registers allows delay of eight interlaces between the position of the word on the storage track and the position of the word on the ripple track. The cycle continues until two conditions have occurred: first, that a blank has ben found on the storage track and second, that storage register B 266 is empty. In other words, the transfer operation from the storage track onto the ripple track is not disabled, or inhibited, by sequential control circuit 216 until two blanks have been found. At this point, the steps used in the insertion of a single word are followed. A simplified example of the intermediate and final results of the operation involved in the insertion of two words into disc file unit 105 is pictorially represented in FIGS. 6A, 6B, and 6C.

Accordingly, I have shown an arrangement for inserting a new entry into its proper position in a content addressable file inculding a rotating memory device having storage tracks where the entries on the tracks are stored in numerical sequence of their address data. This is achieved in part by providing circuitry for detecting the position on a first track which contains the entry which should be next in numerical sequence to the new entry, for locating the first empty position following the detected position, for selectively and temporarily transferring entries from the first track to a second track until the empty position is located, for inserting the new entry into the detected position which previously contained the entry next in sequence, and for retransferring to the first track the entries temporarily stored on the second track. in transferring and retransferring the entries between the first and second tracks, I advantageously employ a one word intermediate storage register so that it is not necessary to read from one track and simultaneously write the same information on the other track. In making room for the new entry on the first track, I provide for the selective transferrence of entries so that it is not necessary to transfer every physically adjacent entry on the first track to the second track. I do this by storing sequentially adjacent entries in an interlaced manner so that these entries are physically separated by a predetermined number of storage locations on the tracks which results in a low duty cycle for the writing circuitry and read/write heads. My method also allows the control circuitry to have time between the appearance of successive entries under the heads in order to make decisions dependent upon the information content of the entry which was just read and transfer information between various parts of the system.

It is understood that the above-described arrangement is merely illustrative of the application of the principles of this invention. Numerous other arrangements may be devised by those skilled in the art without departing from the spirit and scope of this invention.

What is claimed is:

1. A content addressable memory system including a rotatable magnetic record member having a plurality of tracks for storing address and information data entries, successively addressable ones of said entries being stored in a predetermined sequence in spaced positions along said tracks, and means for inserting a new entry on said tracks comprising means for reading stored address data at said spaced positions on a first one of said tracks to determine a unique position in said sequence whose stored address is numerically sequential to the address of said new entry;

means for transferring data from said unique position and from subsequent ones of said spaced positions in said sequence to a second one of said storage tracks;

means for delaying said transferring means for an interval less than an accessibility interval between said spaced positions;

means for detecting an empty position following said unique position in said sequence;

means responsive to said detecting means for disabling said transferring means;

means controlled by said detecting means for writing said new entry into said unique position; and means responsive to said writing means for retransferring to said subsequent ones of said spaced positions in said sequence all said data on said second track.

2. The system of claim 1 wherein said inserting means further comprises means for ascertaining the number of positions to be filled by said new entry; and means responsive to said ascertaining means for disabling said disabling means until said detecting means detects said ascertained number of empty positions following said unique position.

3. A content addressable memory system including a rotatable magnetic record member having a plurality of tracks for storing address and information data entries in sequentially accessible spaced positions on said tracks, successively addressable ones of said entries being stored in a predetermined sequence in positions separated by a predetermined number of said spaced positions, and means for inserting a new entry on said tracks comprising means for reading stored address data at said separated positions on a first one of said tracks to determine a unique position in said sequence whose stored address is numerically sequential to the address of said new entry;

means for transferring data from said unique position and from subsequent ones of said separated positions in said sequence to a second one of said storage tracks;

means for delaying said transferring means for an interval less than an accessibility interval between said separated positions;

means for detecting an empty position following said unique position in said sequence;

means responsive to said detecting means for disabling said transferring means;

means controlled by said detecting means for writing said new entry into said unique position; and means responsive to said writing means for retransferring to said subsequent ones of said separated positions in said sequence all said data on said second track.

4. The system of claim 3 wherein said inserting means further comprises means for ascertaining the number of positions to be filled by said new entry; and means responsive to said ascertaining means for disabling said disabling means until said detecting means detects said ascertained number of empty positions following said unique position.

5. A content addressable memory system including a rotatable magnetic record member having a plurality of storage tracks for storing address and information data entries in storage positions thereon, each of said storage tracks having a single head for reading and writing, said entries being recorded in a predetermined order of increasing sequence of said address data, and apparatus for inserting a new entry within said increasing sequence on said record member in accordance with its address data comprising clock signal means forindicating the appearance of each of said storage positions as it passes under said head;

means responsive to said clock signal means for counting the number of positions that have passed under the heads associated with said storage tracks, said counting means being periodically reset;

means for determining a unique position in said sequence wherein all preceding positions contain entries with address data less than, and said unique position contains an entry whose address data is greater than, the address data of said new entry;

means for detecting an empty position following said unique position in said sequence;

first storing means responsive to said determining means and said counting means for storing the count of said unique position;

second storing means responsive to said detecting means and said counting means for storing the count of said empty position;

means responsive to said determining means and said detecting means for transferring onto a second predetermined track of said record member with a predetermined delay during a first revolution of said record member all recorded entries whose original positions have counts between the contents of said first and second storing means, said predetermined delay being less than an interval between appearances of successive positions under said head;

matching means operative to produce a first indication when the count determined by said counting means is equal to the count stored in said first storing means and to produce a second indication when the count determined by said counting means is equal to the count stored in said second storing means;

means responsive to said first indication for writing said new entry into said unique position;

means enabled by said writing means for retransferring from said second predetermined track all the entries written thereon to positions each successively following the original position of each of said last-mentioned entries; and means responsive to said second indication for disabling said retransferring means.

6. A content addressable memory system comprising a record member having a first track including a plurality of sequentially accessible positions thereon for the storage of data items;

a second track on said record member;

means for storing data items in said positions of said first track in numerical order, numerically successive ones of said items being separated by a predetermined number of said positions;

first means for transferring data items from a first and from subsequent ones of said separated positions onto said second track;

means for delaying said first transferring means by a first delay interval less than an accessibility interval between said numerically successive items;

means for detecting an empty storage position in said first track located a multiple of said predetermined number of positions from the position of said first one of said separated positions;

means responsive to said detecting means for disabling said first means;

means including said storing means for inserting a new data item in said first one of said separated positions; and means for transferring data items from said second track to said subsequent ones of said separated positions after a delay interval equal to said accessibility interval between said numerically successive items less said first delay interval.

7. A content addressable memory system comprising memory means defining at least a first and a second track, said first track storing address and information data entries in sequentially spaced positions and said data entries being successively addressable;

means for reading stored address data from said first track to determine a unique position in said sequence for the insertion of a new entry;

means for transferring data from said unique position and from subsequent ones of said spaced positions to said second track;

means for detecting an empty position following said unique position in said sequence;

means responsive to said detecting means for disabling said transferring means;

means controlled by said detecting means for writing said new entry into said unique position; and means responsive to said writing means for retransferring from said second track to said first track all said data from said subsequent ones of said spaced positions.

8. A content addressable memory system in accordance with claim 7 wherein said address and information data are stored in said predetermined sequence on said first track in positions separated by a predetermined number of said spaced positions and further comprising means for delaying said transferring means for an interval less than an accessibility interval between said separated positions.

References Cited

UNITED STATES PATENTS

| | | | |
|---|---|---|---|
| 2,877,450 | 3/1959 | Hamilton et al. | 340—172.5 X |
| 3,340,539 | 9/1967 | Sims | 340—172.5 X |
| 3,345,612 | 10/1967 | Goldman | 340—172.5 |
| 3,427,596 | 2/1969 | Hertz | 340—172.5 |
| 3,444,523 | 5/1969 | Dirks | 340—172.5 |

PAUL J. HENON, Primary Examiner

H. E. SPRINGBORN, Assistant Examiner